United States Patent [19]

Yamada et al.

[11] Patent Number: 5,017,126
[45] Date of Patent: May 21, 1991

[54] BLOW MOLDING APPARATUS

[75] Inventors: Akiyoshi Yamada; Yoshiaki Kanoh, both of Ube, Japan

[73] Assignee: Ube Industries, Ltd., Japan

[21] Appl. No.: 412,998

[22] Filed: Sep. 26, 1989

[30] Foreign Application Priority Data

Sep. 27, 1988 [JP] Japan .................................. 63-239841

[51] Int. Cl.⁵ .............................................. B29C 49/64
[52] U.S. Cl. ..................................... 425/526; 264/535
[58] Field of Search ............. 425/526, 522, DIG. 110, 425/DIG. 246; 249/79, 80; 264/535

[56] References Cited

U.S. PATENT DOCUMENTS

| | | | |
|---|---|---|---|
| 2,767,449 | 10/1956 | Tueth | 249/79 X |
| 2,907,070 | 10/1959 | Van Hartesveldt | 425/DIG. 110 |
| 3,289,257 | 12/1966 | Richards | 249/79 X |
| 3,932,096 | 1/1976 | Kartman | 425/526 X |
| 4,872,827 | 10/1989 | Noda | 425/526 |

FOREIGN PATENT DOCUMENTS 57-20328 2/1982 Japan .................................. 425/526
59-54524 3/1984 Japan .
63-2769 1/1988 Japan .

Primary Examiner—Richard L. Chiesa
Attorney, Agent, or Firm—Finnegan, Henderson, Farabow, Garrett & Dunner

[57] ABSTRACT

An apparatus for blow-molding a hollow double wall type article using a mold incorporated with a heating and cooling system. The mold consists of male and female mold halves, each composed of an outer shell area having a contoured cavity surface part and an inner heat insulating area defined within the outer shell area. The cavity surface part is made of mainly of a metallic material having a high thermal conductivity, and the inner heat insulating area is provided therein with a reinforcing block for reinforcing the outer shell area against a blow molding pressure and a mold clamping pressure. The inner heat insulating area provides a substantial thermal insulation against a transmission of heat thereto from the cavity surface part. The reinforcing block may be formed of a non-metallic material having a low thermal conductivity. Preferably, the block is permeably porous so that it provides heat medium passages for the heating and cooling system.

11 Claims, 7 Drawing Sheets

BLOW MOLDING APPARATUS

BACKGROUND OF THE INVENTION

1. Field of the Invention

The present invention relates to an improved apparatus and process for blow molding, particularly to an apparatus and process for producing a hollow double wall type plastic article by the blow molding.

2. Description of the Related Art

The blow molding process is a well known method of producing hollow plastic articles. Initially, the blow molding process was directed to the production of a hollow article having a solid wall with a generally convex peripheral outer surface. Most of such hollow articles are basically rotation symmetrical or plane symmetrical. Recently, a modified blow molding process of producing a hollow article having a basically concave, convex or bowl shape with a hollow double wall, has been proposed.

This modified blow molding process uses a mold consisting of a male or convex mold half and a female or concave mold half, both mold halves defining a mold cavity having a concave shape. The hollow double wall type article has a concave inner surface portion and a convex outer surface portion, both forming the hollow double wall with a substantially uniform small gap between the two surface portions over substantially the entire area thereof. Most of such hollow double wall type articles are designed to have an overall contour showing relatively shape angled corners, since they are inherently intended for use in place of conventional solid wall type articles produced by a normal injection molding method or a vacuum molding method.

In this connection, the modified blow molding process is intended to effect a formation of such convex and concave surface portions, each having a substantially uniform resin thickness over the entire surface area, as far as possible, but it has been realized that the resin thickness at the corners is likely to be smaller than that at the other parts of the hollow double wall, due to the nature of the blow molding. Further, it is noted that a mold for use in the modified blow molding has a larger cavity surface with a smaller cavity volume or space, than those of the mold for use in the original blow molding. Therefore, a considerably higher molding capability is required for the modified blow molding than that for the original blow molding.

To cope with this inherent problem involved in the production of a hollow double wall type article, various types of improved heating and cooling systems to be incorporated in a mold have been provided.

For example in a prior art blow molding apparatus as shown in FIG. 6, the mold has male and female mold halves 3 and 4, both made entirely of a metallic material. Each mold half 3 and 4 has spaced pipes 5 embedded, or has spaced through-holes formed, in the metallic body in the vicinity of a cavity surface 3a or 4a. The pipes are used for heating the cavity surface, which has been cooled in the last molding cycle, with a heating medium such as hot water to a temperature of 20° C. to 80° C., necessary before a mold cavity can receive a resin portion 2 of a hot plasticized resin extruded from an extruder 1.

The heating of the cavity surfaces is intended to promote the function of the cavity surfaces, in cooperation with the hot resin portion forced to expand by blowing air thereinto using an air injector, to cause the expanding resin portion, as a whole, to be effectively deformed along the cavity surfaces and to fit thereon. The same pipes 5 are used in the same molding cycle to cool the cavity surface of the mold by flowing a cooling medium therethrough just before the blow molding is completed, to thereby cool a molded article in the cavity. These heating and cooling steps are carried out in each molding cycle.

In other prior art disclosed in JP B 63-2769, intended for a production not of a hollow double wall type article but of a normal hollow article such as a plastic bottle, although it may be applied for a production of such a hollow double wall type article, spaced passages formed in mold halves made entirely of a metallic material are similar to those of the first mentioned prior art but are different therefrom in that a laminate film consisting of an electric insulator film and an electric conductor film coated thereon, are used which laminate film is attached to a corresponding cavity surface of each mold half over the entire area thereof. Heating is effected by flowing a current through the attached film, and cooling is effected by flowing a cooling medium through the passages.

In other prior art as disclosed in JP A 59-54524 is directed to the blow molding apparatus as shown in FIG. 7. A male mold half 3 made entirely of a metallic material has spaced passages 5 formed therein at corners of a cavity surface 3a, through which a cooling medium flows, and electric heating coil units 6 embedded therein near the corners, and a female mold half 4 made entirely of a metallic material is provided with the same heating coil units 6 embedded therein near corners of a cavity surface 4a, and with two groups of perforated disks 7 and 8 dispersed therein at the corners, the first group of disks 7 being associated with passages formed in the mold half communicating with a cold gas source and the second group of disks 8 being associated with other passages 10 formed in the mold half for discharging the cold gas fed from the first group disks 7 into a mold cavity. Alternatively, the cooling passages 5 of the male mold half 3 may be replaced by the some first and second group of disks 7 and 8 and passages 9 and 10 associated therewith as those of the female mold half 4, or the first and second group of disks 7 and 8 of the female mold half 4 may be replaced by the same cooling passages 5 as those of the male mold half 3. The heating coil units 6 are actuated to heat the cavity surfaces before a resin portion 2 of a hot plasticized resin extruded from an extruder 1 is introduced into a mold cavity. While the resin portion is in the process of expansion in the cavity, due to a gas blowing into the resin portion from a gas injector or a blow gas pin, a cold gas or liquid medium is forced to flow through the cooling passages 5 of the male mold half 3 to cool the corner parts of the cavity surface, and a cold gas medium is forced to flow into the cavity from the first group of disks 7 and is discharged from the second group of disks 8 to thereby cool parts of the resin portion to be molded to form corner parts of a resultant article.

The heating and cooling system is intended to effectively prevent a blow molded article from having corner parts with a thinner thickness relative to the other parts, whereby the molded article of a hollow double wall type is provided with a resin thickness with less variation over the entire surface.

JP A 59-54524 does not disclose a cooling of the molded article in the mold cavity just before the mold is opened, but it is assumed, as a matter of nature, that the molded article would be cooled by using the cooling passages 5. Nevertheless a question remains of how effectively the passages 5, originally intended for use in cooling the corner parts of the cavity surfaces, work to cool the mold articles as a whole.

The above-mentioned prior art devices are able to attain some improvements for higher quality articles, particularly hollow double wall type articles having a resin thickness with less variations, but the present inventors realized that they share the some serious problem in that the adopted heating and cooling system incorporated in the mold causes a blow molding cycle to take a considerably longer time than that of the above mentioned original blow molding for producing solid wall type hollow articles. This is because the original blow molding process does not always use both heating and cooling steps, but may have only a cooling step for cooling a molded article before a removal thereof from a mold. In this connection, the modified blow molding process always requires the time necessary for the heating step, in addition to the time for the cooling step, at every molding cycle.

Further, it is most important to note that the modified blow molding process requires alternately and repeatedly heating and cooling the mold, while the molding cycle is repeated.

The present inventors recognized that the above repetition causes a substantial operational delay due to the alternate cooling and heating, with the result that the molding cycle time is prolonged by the operational delay.

Still further, it is noted that the conventional modified blow molding processes have another problem in that the cavity surfaces of the mold are not cooled in such a way that a uniform cooling effect for the molded article is exhibited over the entire area thereof, i.e., they are cooled to exhibit a variation of cooling effect over the entire area.

Such a variation of the cooling effect is likely to lead to molded articles having poor qualities such as poor dimensional accuracy and surface shrinkage, and/or a surface quality poor in gloss or poor in image transfer or transcription from the contoured cavity surface.

SUMMARY OF THE INVENTION

An object of the present invention is to provide a blow molding apparatus comprising an improved mold which solves the above-mentioned problems of the operational delay due to heating and cooling the mold and the variation of the cooling effect at the mold cavity surface.

Another object of the present invention is to provide a blow molding process using the above improved mold, wherein the heating and cooling steps are combined so that a high quality hollow double wall type article is blow-molded in a short cycle.

The present inventors first conceived an idea for overcoming the problems of the prior art, wherein if each mold half consisted mainly of a thin metallic layer incorporated with a heating and cooling system for heating and cooling the metallic layer, and the layer per se provided a contoured cavity surface, such an operational delay in the heating and cooling of the mold, and such a variation of cooling effect at the cavity surface as in the prior art mold would be eliminated. This idea would be reasonable and operable so long as such a thin metallic cavity surface layer had been adequately reinforced by some means to enable resistance against a mold clamping pressure and a blow molding pressure exerted by a blow gas introduced into a resin portion.

This idea is in marked contrast to the prior art wherein each mold half is formed of a metallic block having a generally cubic shape, wherein one of the block surfaces is contoured to form a cavity surface. It is obvious that the conventional mold consisting of two metallic blocks forming mold halves must have a much greater heat capacity than the above assumed mold having the thin metallic layers. Such a large heat capacity causes the disadvantageous operational delay due to heating and cooling.

The present invention embodies the above idea in combination with another critical idea that a substantial thermal insulator per se provides the above-mentioned reinforcing means. In connection with this, it should be noted that the present invention is advantageous and reasonable on the ground in that a molding pressure and a mold clamping pressure for use during the blow molding are considerably lower than those used in an injection molding. In this connection, various types reinforcing means can be easily employed in combination with the thin cavity surface layer of a metallic material. The metallic material is preferably a material having a high thermal conductivity.

With the mold of the present invention, an improved blow molding process can be provided wherein a resin portion of a plasticized resin extruded from an extruder is preheated as a whole at the outer surface thereof by a U shape radiation heater, before the main heating thereof. The U shape radiation heater heats not only the resin portion but also the cavity surfaces of the mold halves while the mold is open. Alternatively, in addition to such preheating, the resin portion is preheated as a whole at the inner surface thereof by using a hot blow gas while it is in the process of expansion due to the blow gas. Further, such a hot blow gas may be alternated with a cold blow gas just before a mold is opened, to thereby cool a molded article at the inner side thereof, while the article is cooled at the outer surface thereof by a cooling system incorporated in the mold.

The above heating and cooling are advantageous in producing a hollow double wall type high quality article, and in shortening the mold cycle by a considerable time compared to the prior art, since the mold of the present invention eliminates the operational delay due to heating and cooling.

According to the present invention, there is provided a blow molding apparatus comprising an extruder and a mold having heat medium passages formed therein and communicating with a heat medium source to be incorporated with the mold, for producing hollow plastic articles. Each of the mold halves, in combination, forming the mold is composed of: an outer shell area of a shell housing having an inner shell part which is contoured so that the mold halves, in combination, define a mold cavity at the inner shell parts thereof; and an inner heat insulating area defined within the shell housing, the inner shell contoured part being made mainly of a metallic material having a high thermal conductivity. The inner heat insulating area is provided therein with a means for reinforcing the shell housing against a mold clamping pressure and a blow molding pressure. The inner heat insulating area provides a substantial thermal insulation against a transmission of heat thereto from the inner shell contoured part.

The reinforcing means may be formed by a permeable porous block of a non-metallic material having a low thermal conductivity and substantially filling the entire interior of the shell housing. The permeable block provides the heat medium passages therein.

Alternatively, the reinforcing means may be formed by a block of a non-metallic material having a low thermal conductivity and substantially filling the entire interior of the shell housing. The heat medium passages are arranged in parallel in the inner shell contoured part and extend over the entire width of the mold half while spaced from each other.

Alternatively, the inner heat insulating area may be further provided with spaced metallic conduits defining the heat medium passages therein. The conduits are arranged in parallel and in contact with the inner shell contoured part at the inner side thereof to extend over the entire width of the mold half. The reinforcing means is formed by a block of a non-metallic material having a low thermal conductivity and substantially filling the interior of the shell housing except for the portions in which the conduits are extended. The inner shell contoured part may form an integral part of the individual conduits.

Alternatively, the reinforcing means may be formed by spaced supporting plates. Each plate being arranged in parallel to the other plates and extending over a cross-sectional area of the inner heat insulating area to provide a gap between each adjacent plate and between the shell housing and a plate adjacent thereto. The supporting plates have through-holes forming the heat medium passages in combination with the gaps.

The above-mentioned heat medium passages may be provided as a means for cooling the inner shell contoured part by flowing a cooling medium therethrough.

Alternatively, the heat medium passages may be provided as a means for heating and cooling the inner shell contoured part by alternately flowing heating and cooling mediums therethrough or some of the heat medium passages may be provided as means for heating the inner shell contoured part by flowing a heating medium therethrough, while the other heat medium passages are provided as means for cooling the same by flowing a cooling medium therethrough.

According to the present invention, the above-mentioned mold having the reinforcing means formed by a permeable porous block of a non-metallic material is preferably embodied as follows. The outer shell area is basically in a shape of a cube including the inner shell contoured part and substantially flat outer, lower, upper and side shell parts. The inner shell contoured part has a first group of holes arranged at corner portions thereof, each having a perforated metallic disk disposed therein for sucking gas in the mold cavity into the mold half, and a second group of holes arranged at the other portion of the inner shell contoured part, each having a perforated metallic disk disposed therein for feeding hot gas from the mold half into the mold cavity therethrough. The inner heat insulating area has a conduit system embedded in the permeable porous block, which forms passages therein communicating with the second group of holes and a hot gas source to be incorporated with the mold through a hole provided in the lower shell part. The outer shell area has at least one through-hole at the outer shell part opposite to the inner shell contoured part for feeding a cooling medium from a cooling medium source to be incorporated with the mold into the permeable inner heat insulating area. The upper and lower shell parts or the two side shell parts opposite to each other have holes near to the opposite ends of the inner shell contoured part, respectively. Both the holes communicate with a vacuum source to be incorporated with the mold and are commonly used for discharging from the mold half the cooling medium fed into and the gas sucked into the permeable inner heat insulating area. Each mold half has an additional area adjacent to the outer shell part at the outside thereof opposite to the inner shell contoured part. The additional area is formed by chambers separated by at least one partition having a hole through which the chambers communicate with each other. One of the chambers has a hole open to the cooling medium source. The outer shell part has holes through which the chambers respectively communicate with the permeable inner heat insulating area.

Further, according to the present invention, there is provided a blow molding process of producing hollow plastic articles using the above-mentioned mold having an inner heat insulating area other than that of the permeable porous block. This process comprises the steps of extruding a resin portion of a plasticized material into a gap between the mold halves while the mold is open, blowing gas into the resin portion at least while the mold is closed so that the resin portion is molded to form a hollow article; and cooling the molded article just before the mold is opened. The inner shell contoured parts of the mold halves at the surfaces thereof and the resin portion at the outer surface thereof, are both heated by using an instantaneous U shape radiation heater disposed in the mold half gap to partially encompass the resin portion just before the mold is closed. The cooling of the molded article is effected at the outer surface thereof by cooling the mold at the inner shell contoured parts thereof by flowing a cooling medium through the heat medium passages of the mold.

The heating of the resin portion is additionally effected at the inner surface thereof by blowing hot gas into the resin portion while allowing the blown gas to flow out of the resin portion, the blown hot gas exerting as a blowing gas an internal pressure on the resin portion to force the resin portion against the mold to form the molded article.

Further, the cooling of the article is additionally effected at the inner surface thereof by blowing cold gas into the article as a subsequent blowing gas while allowing the blown gas to flow out of the article, the hot blowing gas and the cold blowing gas being made alternately to flow while the mold is closed.

Preferably, the inner shell contoured parts of the mold are heated at the surfaces thereof to a temperature of 90° to 200° C.

With respect to the above-mentioned mold having the permeable porous block and the first and second disks, a blow molding process of the present invention comprises the steps of extruding a resin portion of a plasticized material into a gap between the mold halves while the mold is open, blowing gas into the resin portion at least while the mold is closed so that the resin portion is molded to form a hollow article, and cooling the molded article just before the mold is opened. The resin portion at the outer surface thereof and the inner shell contoured parts of the mold at the surfaces thereof, are both heated by flowing hot gas from the second group disks into the mold cavity through the conduit system of the mold until a time just before the mold is closed, while the hot gas is sucked out of the mold from the first group disks thereof through the heat medium passages thereof. The sucking operation is continued until a very short time just before the mold is closed so that the heated resin portion is deformed along the line of the mold cavity. The cooling of the molded article is effected at the outer surface thereof by cooling the mold at the inner shell contoured parts thereof by flowing a cooling medium through the heat medium passages of the mold before the mold is opened. The cooling of the mold by the cooling medium is effected alternately with the sucking. Additional heating of the resin portion at the outer surface thereof and additional heating of the inner shell contoured part at the surface thereof, may be both effected by using an instantaneous U shaped radiation heater disposed in the mold half gap to partially encompass the resin portion while the mold is open but before the heating by the hot gas flowing into and being sucked from the mold cavity. The heating of the resin portion may be further effected at the inner surface thereof when the mold is closed by blowing hot gas into the resin portion while allowing the blown gas to flow out of the resin portion. The blown hot gas exerts as a blowing gas an internal pressure on the resin portion to force the resin portion against the mold to form the mold article. Additional cooling of the article may be effected at the inner surface thereof by blowing cold gas into the article as a subsequent blowing gas. The hot blowing gas and the cold blowing gas are made to alternately flow while the mold is closed.

DESCRIPTION OF THE PREFERRED EMBODIMENTS

An embodiment of the present invention directed to a blow molding apparatus and process for producing a hollow double wall type article will be now described with reference to FIGS. 1 to 4.

Figure 1:
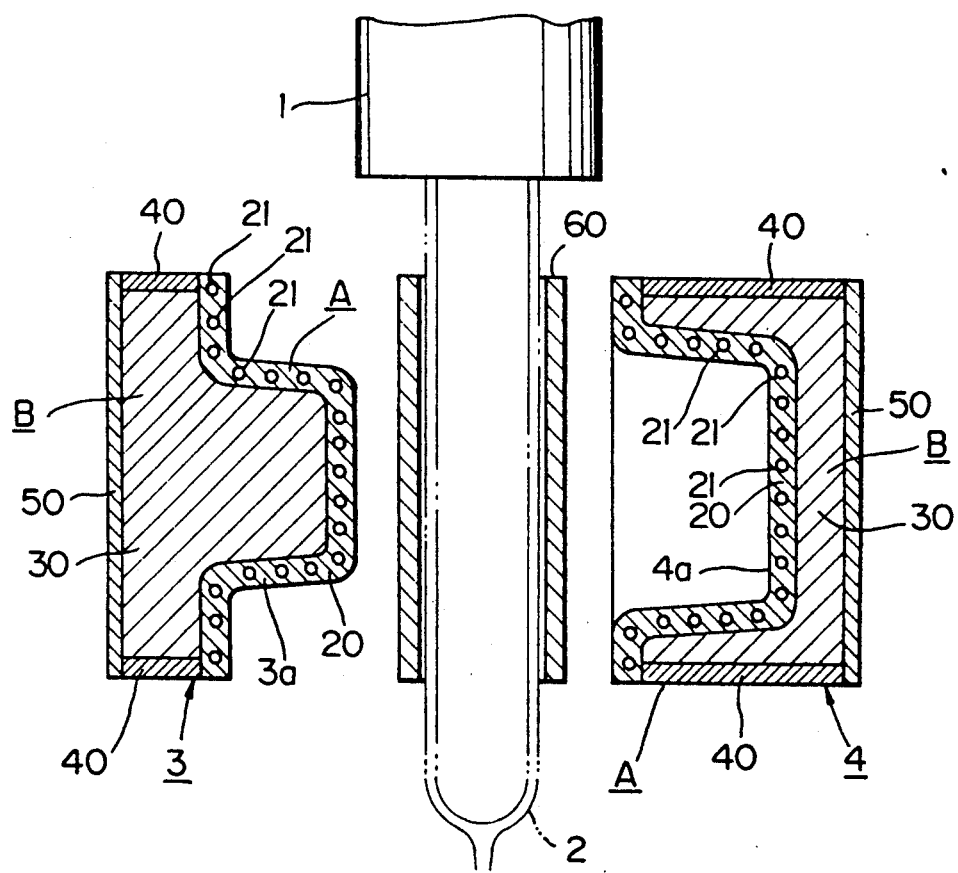
FIGS. 1 to 3 are vertical sectional views showing blow molding apparatuses including molds incorporated with heating and cooling systems for producing hollow double wall type articles according to the present invention.

Referring to FIG. 1, the apparatus comprises an extruder 1 with a die for extending a resin portion 2 of a plasticized resin, a mold consisting of a male mold half 3 and a female mold half 4, and an instantaneous U-shape radiation heater 60. The instantaneous radiation heater 60 comprises vertically extending tube lamps arranged in a U-shape frame body such that each lamp radiates near infrared rays in the radial direction. Such a lamp per se may be a conventional lamp, for example, made by Philips Co. The die has a gas outlet hole 60 through which air is preblown into the resin portion after the resin portion is sealed at the free end thereof, to prevent the resin portion from being self-adhered before a normal blowing step is carried out. Each mold half 3 or 4 is composed of an outer shell area A and an inner heat insulating area B. The outer shell area A is formed by a cavity surface part 20 made of a metallic material having a high thermal conductivity, such as Al alloy or Cu alloy, top, bottom and side frame parts 40, and a backing frame part 50, each made of iron. The cavity surface part 20 and the frame parts 40 and 50 are of relatively thin plates and define with the cavity surface part 20, a generally cubic mold contour. The cavity surface parts 20 have desired male and female contours defining, in combination, a mold cavity. Each cavity surface part 20 has many spaced through-holes 21 for flowing a heat medium therethrough as shown in FIG. 1. Alternatively, there may be provided many spaced pipes 22, for a flow of the heat medium therethrough fixed to the rear surface of the cavity surface parts 20. Preferably, such pipes are partially integrated with the cavity surface part 20.

The inner heat insulating area B is defined by the outer shell area A and is filled with a non-metallic material such as silica sand, stone, ceramics, epoxy resin, phenol resin, unsaturated polyester resin, polyurethane resin or the like.

The filler may be a solid block, but preferably is a porous block or has a honey comb structure. With respect to the resin material, preferably the filler is formed of a block of a foamed resin.

The inner heat insulating area B having the above-mentioned filler provides a substantial thermal insulation against a transmission of heat from the cavity surface part 20, and further, provides a means for reinforcing the inner shell area A consisting of the cavity surface part 20 and the frame parts 40 and 50 against a blow molding pressure and a mold clamping pressure.

Figure 3:
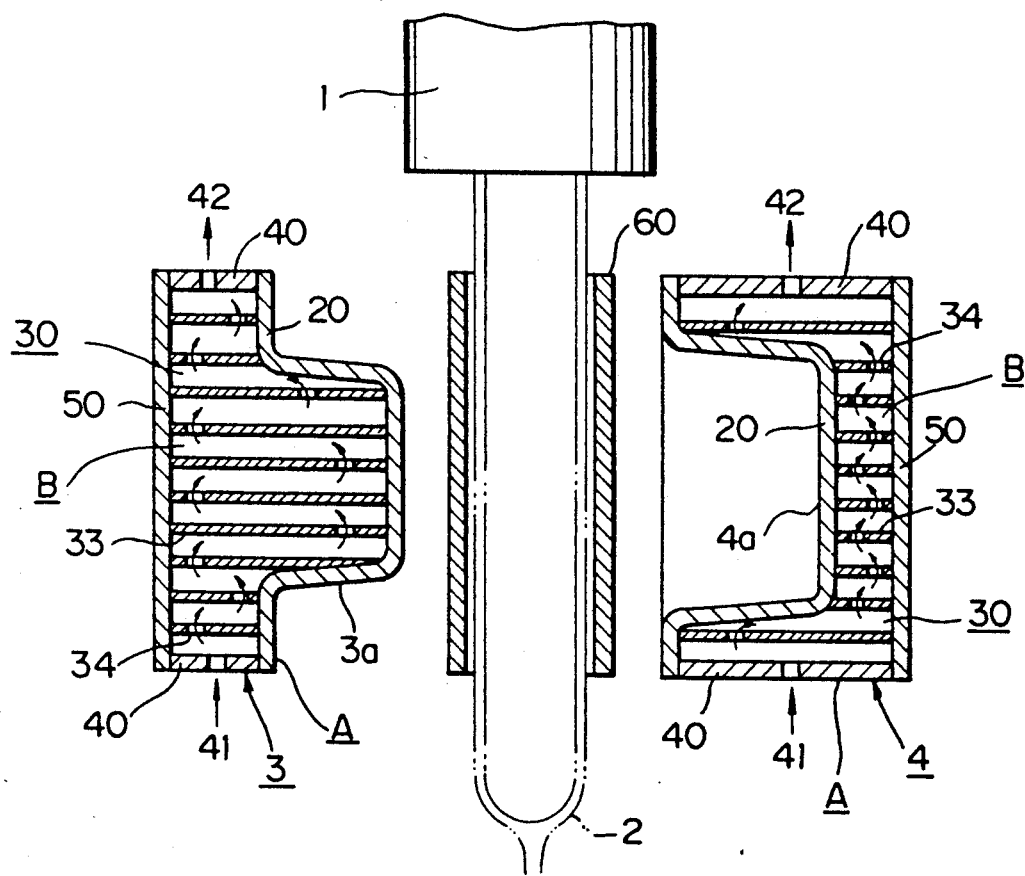

Alternatively, as shown in FIG. 3, the inner heat insulating area B is provided with many spaced plates 33 of a material having a high strength, arranged so as to reinforce the outer shell area or shell housing A and to define gaps between the neighboring plates. The supporting plates 33 have through-holes 34, and the frame parts 40 have inlet and outlet holes 41 and 42. A heat medium is allowed to flow into the mold half 3 or 4 through the inlet hole 41, flow through the holes of the plates 33 and the gaps between the plates 33, and flow out of the mold half through the outlet hole 42, while the heat medium is allowed to be in contact with the cavity surface part 20 at the rear thereof.

The female mold half 4 is provided with two conventional movable probes (not shown) disposed in the mold body; and for introducing a pressurized blow gas into the resin portion and the other for discharging the gas from the resin portion during a blow molding step.

Figure 4:
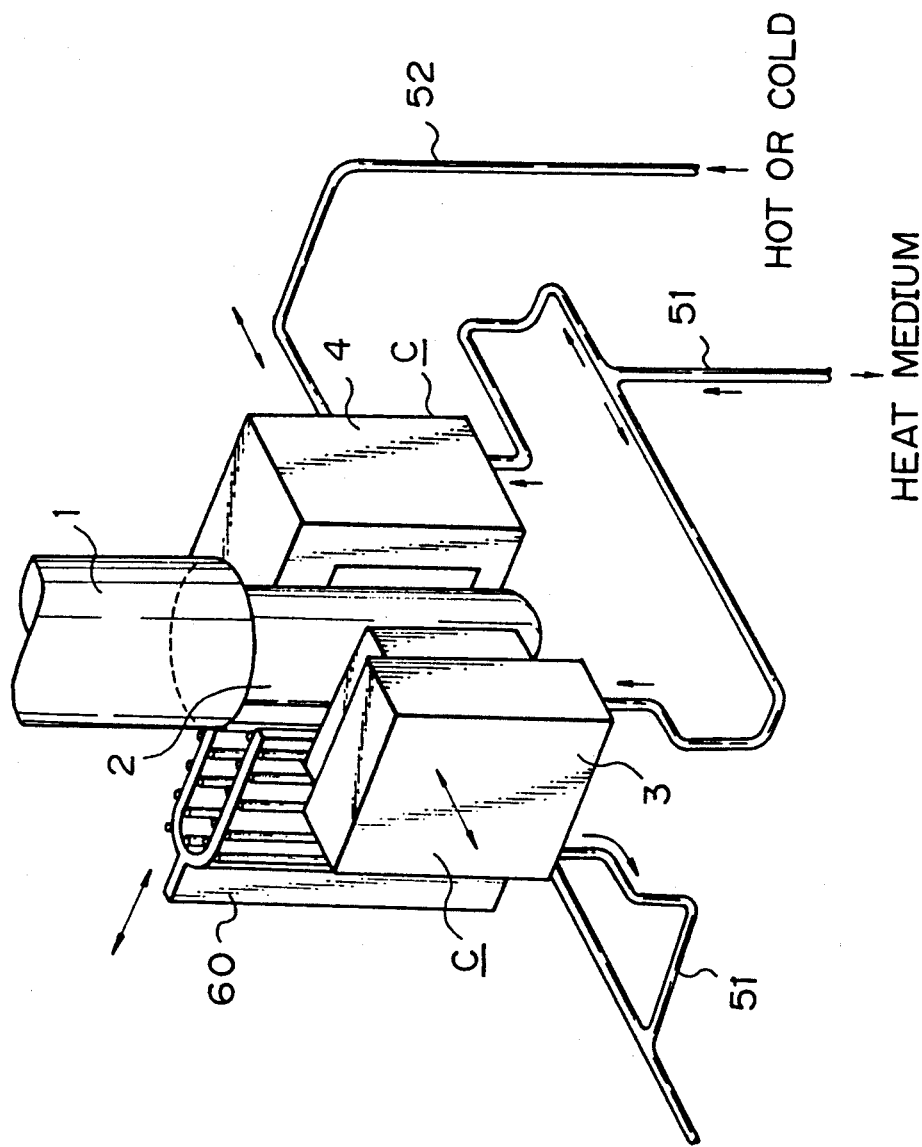
FIG. 4 is a perspective view of the apparatus of the present invention.
Figure 5:
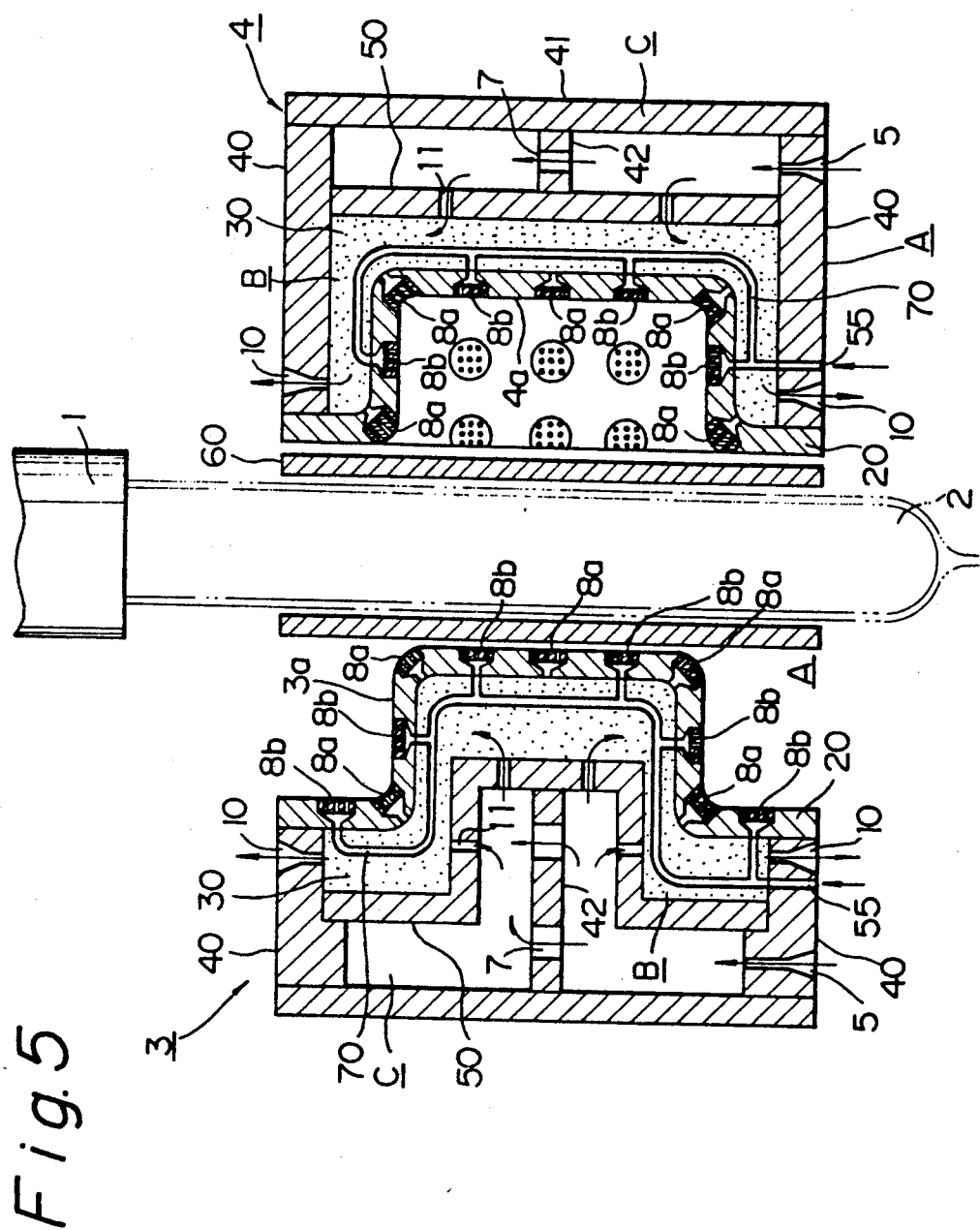
FIG. 5 is a view corresponding to FIG. 1, and showing another embodiment of the apparatus according to the present invention.
Figure 6:
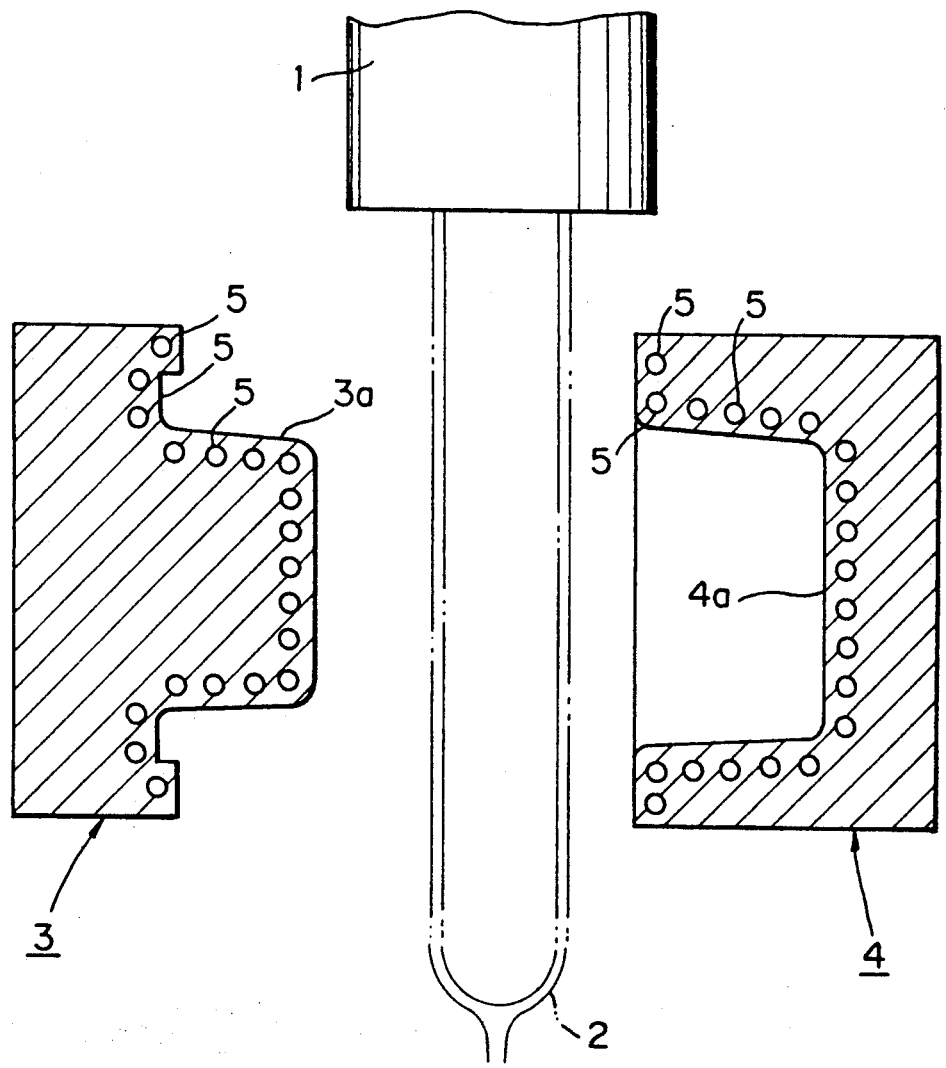
FIGS. 6 and 7 are views corresponding to FIG. 1 and showing conventional molds.
Figure 7:
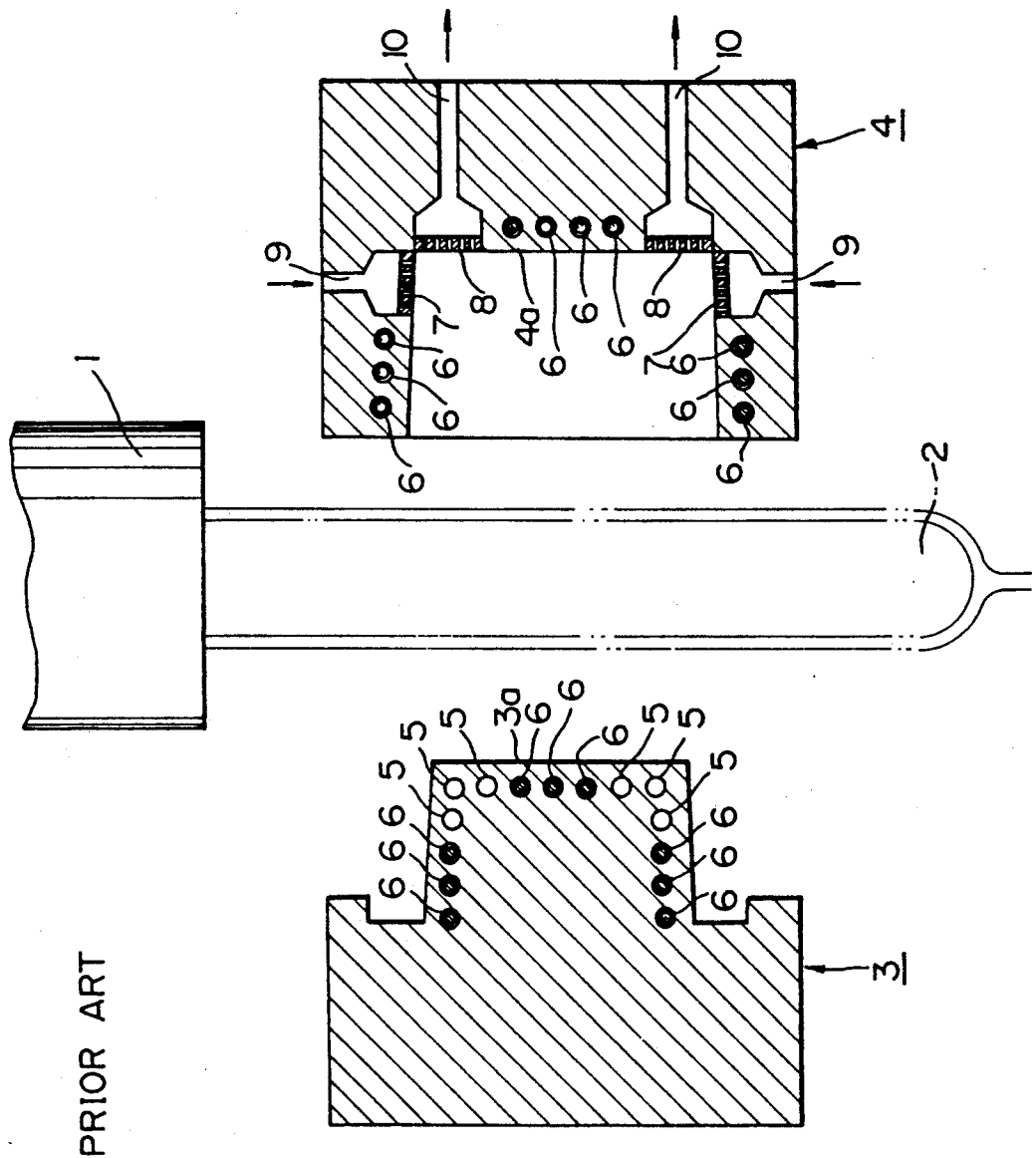

A heating and cooling system is provided in the apparatus as shown in FIG. 4.

Figure 2:
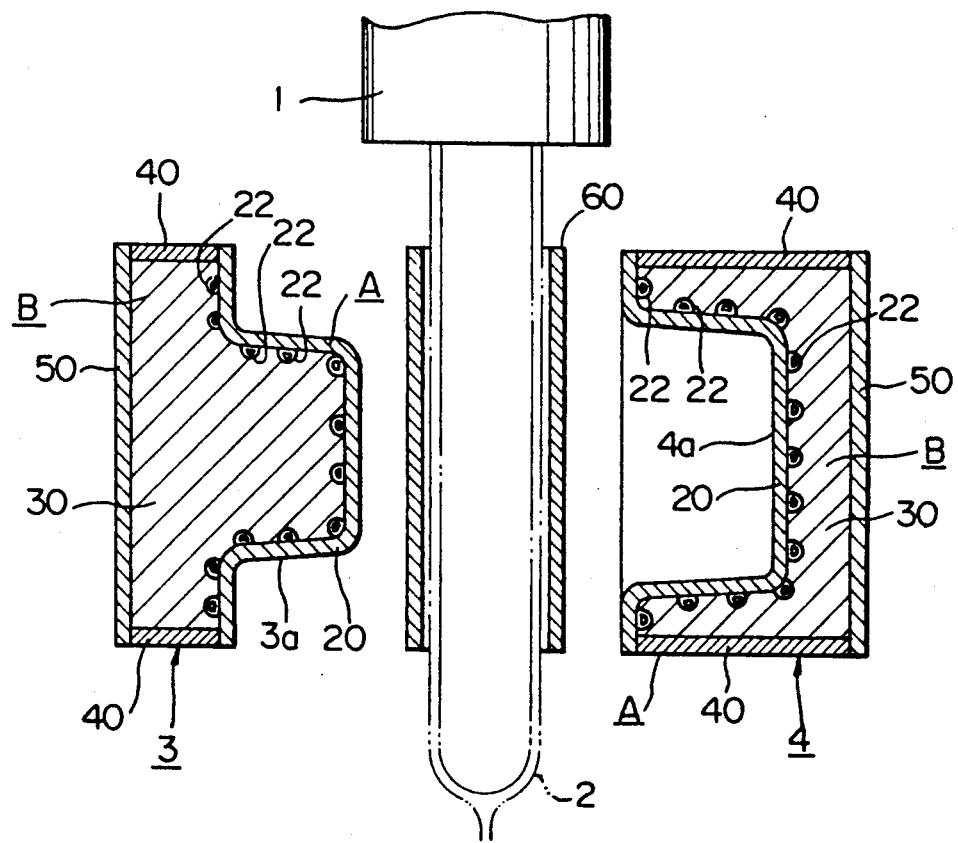

A partially flexible pipe line 51 is designed so that a heating medium source and a cooling medium source are connected alternately therethrough with the inlet hole 41 in FIG. 3, the through-holes 21 in FIG. 1, or the pipes 22 in FIG. 2 to introduce the individual heat medium into the mold so that the cavity surface parts 20 are mainly heated or cooled alternately. The heat medium is discharged from the mold through the outlet holes 42 in FIG. 3, the holes 21 in FIG. 1 or the pipes 22 in FIG. 2, and then through the pipe line 51. The heating and cooling system is also provided with a pipe line 52 extended from a hot blow gas source and a cold blow gas source; both sources being connected alternately with the above-mentioned feeding probe.

According to the present invention, a resin portion of a plasticized resin is extruded downward from the die. The free open end of the resin portion is closed or selfsealed by using a pinch tool, just after the resin portion appears from the die.

Preblow air is fed into the sealed resin portion from the outlet hole of the die. The U-shape radiation heater 60 is moved to and held at a working position between the mold halves 3 and 4 while the mold is open. The resin portion extends downward along a normal route provided inside of the U-shaped radiation heater 60. Just after the closed end of the resin portion passes over the U-shaped heater 60, the heater is retracted horizontally from the working position to an original position out of the mold, and the extrusion of the resin portion is discontinued until a next cycle.

While the U-shaped heater 60 is in the working position, the downward extending resin portion is heated at the outer surface thereof by the heater, and the mold halves 3 and 4 are heated concurrently at their cavity surfaces by the same heater. Since the cavity surface parts 20 are very thin and have a small thermal capacity and a high thermal conductivity, the cavity surfaces are effectively heated in a short time by the U-shaped radiation heater 60.

The heating by the U-shape radiation heater 60 is effected preferably until the cavity surfaces of the mold are brought to a temperature of 90° to 200° C. In the meantime, the resin portion is cooled, particularly at the outer surface thereof, to room temperature while extruded from the die, with the result that the resin portion outer surface becomes harder than the inner part of the resin portion. Such a hardened surface of the resin portion causes a blow molded article to have a lower surface quality. Under these circumstances, the above heating by the U-shaped radiation heater causes a hardened surface of the resin portion to be softened to an extent such that a high molding capability is obtained with a high surface quality.

Upon discontinuation of the extrusion, both the mold halves 3 and 4 are moved in the opposite direction toward each other to have the mold closed with the preblown resin portion therein, while the resin portion 2 is integrated with the die. A hot air as a heating medium and a subsequent normal blow gas are blown continuously into the resin portion received in the mold when the mold is closed through one of the blowing probes, i.e., a feeding probe, and the hot air is discharged through the other probe, i.e., a venting probe. These probes are projected to penetrate the softened resin wall of the resin portion, which has been kept hollow due to the preblowing gas. While the mold is in the process of closing, the resin portion is forcibly deformed along the line of the deeply concaved shape cavity.

The hot blow gas exerts a pressure to force the resin portion against the mold cavity surface, so that the pre-deformed resin portion is completely deformed along the line of the cavity.

The mold is heated at the cavity surface parts 20 before the mold is closed, by flowing a hot water or another liquid through the holes 21, pipes 22 or the holes (41, 42, 34) as shown in FIGS. 1, 2 or 3, with the effect that the expanded resin portion is heated at the outer surface thereof in contact with the cavity surfaces. The heating of the resin portion at both the outer and inner surfaces thereof and the cavity surfaces of the mold halves is very advantageous when making such a deep deformation of the resin portion, and attains a high surface quality of a resultant article and considerably less variation of the resin thickness over the entire surface of the article.

The flowing of the hot blow gas is alternated with a flowing of a cold blow gas, using the same probes, to cool the molded article at the inner surface thereof, when the cavity surface parts 20 of the mold are cooled by flowing a cooling medium through the holes 21 in FIG. 1, the pipes 22 in FIG. 2 or the inlet and outlet holes 41 and 42 in FIG. 3. These cooling steps in combination ensure that the molded article has a higher surface quality compared with that of the prior art.

Although various kinds of heating steps and cooling steps are adopted as described above, the blow molding cycle is shorter than that of the prior art. This is because the mold of the present invention is designed so that mainly the metallic thin cavity surface parts 20 having a high thermal conductivity and a considerably small thermal capacity are subjected to heating and cooling. Whereas the inner area of the mold is not substantially subjected to heating and cooling, since it is provided in the mold as a substantial thermal insulator.

After the molded article is cooled by both the cold blow gas passing through the article and the cooling medium passing through the mold, the mold is opened and the molded article is removed with a top portion of the resin portion 2 remaining out of the mold torn off from the die. As such, a one blow molding cycle has been completed, and a next cycle starts at a state wherein the mold is cooled. This means that the mold is subjected to repeated heating and cooling by the repeated cycles. With the mold of the present invention, heating the mold, which has been cooled and then cooling the heated mold, can be effected in a shorter time and with considerably less variation over the entire cavity surface than in the prior arts, since only a small part of the mold, i.e, the thin cavity surface parts 20, is subjected to the heating and cooling, whereas the entire body of the prior art mold is subjected to the heating and cooling.

A second embodiment of the present invention directed to an apparatus and process for producing the same hollow double wall type article will now be described, in comparison with the first embodiment.

A mold of the second embodiment is different from that of the first embodiment in that a corresponding inner heat insulating area A is filled with a permeable porous non-metallic block, which allows a heat medium to be supplied to the rear surface of a corresponding cavity surface part 20 to thereby heat or cool the part 20.

Another difference resides in that the second embodied mold has first and second groups of perforated metallic disks 8a and 8b disposed in holes formed in the cavity surface part 20. The first group of disks 8a are arranged at the corners of the cavity surface part, and the second groups of disks 8b are arranged at the other portion. A pipe line or system 70 is embedded in the permeable porous block and communicates with the second group of disks 8b, and the first group of disks 8a open to the permeable porous block. The pipe line 70 is connected to a vacuum source through a hole 55 formed at a bottom one of the corresponding frame parts 40. The corresponding top and bottom frame parts 40 have gas outlet holes 10.

The second embodied mold is provided with an additional chamber area C having an additional frame part 41 of iron forming two chambers located outside of a corresponding backing frame part 50 opposite to the cavity surface part 20. The chambers are separated by a partition 42 but communicate with each other through a hole 7 formed in the partition 42, and communicate with the permeable porous block through holes 11 formed in the backing frame part 50. An inlet hole 5 for a heat medium is formed in the bottom frame part 40.

The second embodied mold can be effectively cooled at the cavity surface part 20 by flowing a cooling medium of gas or liquid into the permeable porous block B from the chambers through the holes 11 of the backing frame part, if the heat medium is fed into the chambers from a heat medium source, since a molded article in a closed mold will prevent the cooling medium from flowing into the mold cavity at the first group disks 8a. This cooling is intended to effect a cooling of the molded article.

With the first and second groups of disks 8a, hot gas is introduced into the mold cavity from the second group of disks 8b through the pipe line 70, while the introduced gas is sucked from the first group of disks 8a at the cavity corners. The sucked gas passes through the permeable porous block B and is discharged out of the mold through the outlet hotels 10 of the top and bottom frame parts 40. This is intended to effect a heating of both an expanding resin portion in the mold and the cavity surface before the above-mentioned cooling. That is, the permeable porous block B not only acts as means for reinforcing the outer shell housing including the thin cavity surface part 20 but also acts as common passages for alternately feeding a heating medium and a cooling medium.

A process of blow molding a hollow double wall type article using the above second embodied mold is the same as for the first embodied process, except for the following.

The second embodied mold is heated at the cavity surface before the mold is closed not by a heating medium of gas or liquid passing through the mold as in the first embodied mold but by a hot gas flowing out from the second group of disks 8b through the pipe line 70, while the mold is in the process of closing. Further, a resin portion 2 is heated at the outer surface thereof by the same hot gas before the resin portion is in contact with the cavity surfaces and also the resin portion 2 is urged at the outer surface thereof by the hot gas so that it is effectively deformed along the line of the deeply concaved shape space between the male and female mold halves, which space has a gap which narrows as one of the mold halves approaches the other. This hot gas urging step is carried out after the resin portion is subjected to heating by a corresponding U-shaped radiation heater 60 and while a corresponding preblowing step is continued.

The hot gas fed from the second group of disks 8b is sucked from the first group of disks 8a located at the corners of the mold cavity, into the permeable porous block B and is discharged out of the mold. The hot gas feeding is stopped until a time just before the mold is closed, and the hot gas sucking is stopped until a very short time just before the mold is closed. During a short period of time after the termination of the hot gas feeding until the termination of the hot gas sucking, the sucking at the corners of the mold cavity causes the hot resin portion to be deformed effectively along the line of the deep concaved shape mold cavity having a small gap corresponding to the thickness of a hollow double wall of an article which is to be blow molded, with the effect that a surface quality having a high transcription or image transfer from the contoured cavity surface is obtained, particularly a high quality at the corners of the article is obtained.

A corresponding hot gas blowing step is carried out when the mold is closed, and then a corresponding cold gas blowing step is carried out concurrently with a corresponding mold cooling step just before the mold is opened. According to the mold cooling step, a cold gas or liquid is forced to flow through the permeable porous block from the inlet hole 5 to the outlet hole 10. The cooling medium is forced into contact with the rear surface of the cavity surface part 20 through passages formed due to the permeable porosity thereof, with the effect that the cavity is directly cooled and thus the blow molded article in the cavity is cooled.

The cooling medium may be cold water, but liquefied carbon dioxide is preferable as the cooling medium if used in a gaseous state. This is advantageous in shortening the cooling time, and thus the blow molding cycle.

According to the present invention, a high molding capability for even a hollow double wall type article having a very deep convex, concave, or bowl shape and sharp-angled corners with a substantially uniform resin thickness, a high surface quality and a high dimensional accuracy over the entire surface, can be obtained in a shortened operational cycle.

We claim:

1. In a blow molding apparatus for producing hollow plastic articles including an extruder and a mold having heat medium passages formed therein and having a heat medium source to be coupled with the mold, said mold being alternately subjected to positive heating and cooling, an improvement wherein said mold includes two mold halves, each said mold half comprising a shell housing including an inner shell part, the inner shell part being contoured so that the mold halves define a mold cavity at the inner shell parts thereof, the inner shell contoured part being made of a metallic material having a high thermal conductivity; and a heat insulating area defined within the shell housing, said heat insulating area including means for reinforcing said shell housing against a blow molding pressure and a mold clamping pressure and said heat insulating area providing substantial thermal insulation against a transmission of heat from the inner shell contoured part to the shell housing.

2. A blow molding apparatus according to claim 1, wherein the reinforcing means is formed by a permeable porous block of a non-metallic material having a low thermal conductivity and substantially filling the interior of the shell housing, the permeable block providing the heat medium passages therein.

3. A blow molding apparatus according to claim 1, wherein the reinforcing means is formed by a block of a non-metallic material having a low thermal conductivity and substantially filling the interior of the shell housing, and the heat medium passages are arranged in parallel in the inner shell contoured part and extend over the entire width of the mold half while spaced from each other.

4. A blow molding apparatus according to claim 1, wherein the inner heat insulating area is further provided with spaced metallic conduits defining the heat medium passages therein, the conduits being arranged in parallel and in contact with the inner shell contoured part at the inner side thereof to extend over the width of the mold half, the reinforcing means being formed by a block of a non-metallic material having a low thermal conductivity and substantially filling the interior of the shell housing except for the portions in which the conduits are extended.

5. A blow molding apparatus according to claim 4, wherein the inner shell contoured part forms an integral part of the individual conduits.

6. A blow molding apparatus according to claim 1, wherein the reinforcing means is formed by spaced supporting plates, each plate being arranged in parallel to the other plates and extending over a cross-sectional area of the inner heat insulating area to provide a gap between each adjacent plate and between the shell housing and a plate adjacent thereto, the supporting plates having through-holes forming the heat medium passages in combination with the gaps.

7. A blow molding apparatus according to any one of claims 2 to 6, wherein the heat medium passages are provided as a means for cooling the inner shell contoured part by flowing a cooling medium therethrough.

8. A blow molding apparatus according to any one of claims 2 to 6, wherein the heat medium passages are provided as means for heating and cooling the inner shell contoured part by alternately flowing heating and cooling mediums therethrough.

9. A blow molding apparatus according to any one of claims 2 to 6, wherein some of the heat medium passages are provided as means for heating the inner shell contoured part by flowing a heating medium therethough, while the other heat medium passages are provided as means for cooling the same by flowing a cooling medium therethrough.

10. A blow molding apparatus according to claim 2, wherein: the outer shell area is substantially in a shape of a cube including the inner shell contoured part and substantially flat outer, lower, upper and side shell parts; the inner shell contoured part has a first group of holes arranged at corner portions thereof, each having a perforated metallic disk disposed therein for sucking gas in the mold cavity into the mold half, and a second group of holes arranged at the other portion of the inner shell contoured part, each having a perforated metallic disk disposed therein for feeding hot gas from the mold half into the mold cavity therethrough; the inner heat insulating area having a conduit system embedded in the permeable porous block, which forms passages therein communicating with the second group of holes and a hot gas source to be coupled with the mold through a hole provided in the lower shell part; and the outer shell area having at least one through-hole at the outer shell part opposite to the inner shell contoured part for feeding a cooling medium from a cooling medium source to be coupled with the mold into the permeable inner heat insulating area, and the upper and lower shell parts or the two side shell parts opposite to each other having holes near to the opposite ends of the inner shell contoured part, respectively, both the holes communicating with a vacuum source be coupled with the mold and being commonly used for discharging from the mold half the cooling medium fed into and the gas sucked into the permeable inner heat insulating area.

11. A blow molding apparatus according to claim 10, wherein each mold half has an additional area adjacent to the outer shell part at the outside thereof opposite to the inner shell contoured part, the additional area being formed by chambers separated by at least one partition having a hole through which the chambers communicate with each other, one of the chambers having a hole open to the cooling medium source, the outer shell part having holes through which the chambers respectively communicate with the permeable inner heat insulating area.

* * * * *